United States Patent
Liu et al.

(10) Patent No.: US 10,776,548 B1
(45) Date of Patent: Sep. 15, 2020

(54) PARALLEL MONTE CARLO SAMPLING FOR PREDICTING TAIL PERFORMANCE OF INTEGRATED CIRCUITS

(71) Applicant: Cadence Design Systems, Inc., San Jose, CA (US)

(72) Inventors: Hongzhou Liu, Sewickley, PA (US); Wangyang Zhang, Allison Park, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 327 days.

(21) Appl. No.: 15/471,871

(22) Filed: Mar. 28, 2017

(51) Int. Cl.
  *G06F 30/367* (2020.01)
  *G06F 111/10* (2020.01)

(52) U.S. Cl.
  CPC ........ *G06F 30/367* (2020.01); *G06F 2111/10* (2020.01)

(58) Field of Classification Search
  CPC ... G06F 17/5036; G06F 17/16; G06F 2217/16
  See application file for complete search history.

(56) References Cited

U.S. PATENT DOCUMENTS

| | | | | |
|---|---|---|---|---|
| 8,155,938 B2 * | 4/2012 | Singhee | .............. | G06F 17/5036 703/6 |
| 8,601,416 B2 * | 12/2013 | Kuo | ..................... | G06F 17/5036 716/106 |
| 8,612,908 B2 * | 12/2013 | Cooper | ............... | G06F 17/5036 716/106 |
| 8,806,418 B1 | 8/2014 | Jallepalli et al. | | |
| 8,813,009 B1 | 8/2014 | Liu et al. | | |
| 8,954,910 B1 * | 2/2015 | Liu | ..................... | G06F 17/5009 716/106 |

(Continued)

OTHER PUBLICATIONS

Nourredine Akkouche et. al., Minimization of Functional Tests by Statistical Modelling of Analogue Circuits, Oct. 2007, Proceedings—2007 International Conference on Design and Technology of Integrated Systems in Nanoscale Era, pp. 35-40. (Year: 2007).*

(Continued)

*Primary Examiner* — Jay Hann
(74) *Attorney, Agent, or Firm* — Vista IP Law Group, LLP

(57) ABSTRACT

A method for determining the tail performance of an integrated circuit is described. The method includes simulating the integrated circuit over samples to obtain values for circuit specifications and sorting the circuit specifications based on an expected number of samples. The method also includes arranging a sequence of samples from the universe according to a sequence in the group of circuit specifications, simulating the integrated circuit with one of the sequence of samples to obtain at least one circuit specification, removing the at least one circuit specification from the group when it satisfies the stop criterion, and modifying a model for a second circuit specification based on the at least one circuit specification. The computer-implemented method also includes reordering the group of circuit specifications based on the model and determining an integrated circuit performance based on a simulation result for the at least one circuit specification.

20 Claims, 8 Drawing Sheets

(56) References Cited

U.S. PATENT DOCUMENTS

| | | | |
|---|---|---|---|
| 9,043,771 B1* | 5/2015 | Vardhan | G06F 8/4435 717/151 |
| 9,483,602 B2* | 11/2016 | McConaghy | G06F 17/5022 |
| 9,524,365 B1 | 12/2016 | Liu et al. | |
| 9,836,564 B1* | 12/2017 | Zhang | G06F 17/5022 |
| 10,083,257 B2* | 9/2018 | Kuo | G06F 17/5009 |
| 2007/0198956 A1 | 8/2007 | Liu | |
| 2013/0304439 A1* | 11/2013 | Van der Velden | G06F 17/5009 703/6 |
| 2016/0283629 A1* | 9/2016 | Weckx | G06F 17/5036 |

OTHER PUBLICATIONS

Sengupta, M., et al. "Application-Specific Worst Case Corners Using Response Surfaces and Statistical Models" IEEE Transactions on Computer-Aided Design of Integrated Circuits & Systems, vol. 24, No. 9, pp. 1372-1380 (2005) (Year: 2005).*

Zhang, H., et al. "Efficient Design-Specific Worst-Case Corner Extraction for Integrated Circuits" IEEE 46th Design Automation Conf. (2009) available from <https://ieeexplore.ieee.org/abstract/document/5227114> (Year: 2009).*

Zhang, et al., Accelerating Monte Carlo Analysis at Advanced Nodes, Jun. 22, 2016, pp. 1-9 (Year 2016).

Sheather, et al., A Reliable Data-Based Bandwidth Selection Method for Kernel Density Estimation, 1991, Journal of the Royal Statistical Society, vol. 53, Issue 3, pp. 683-690. (Year: 1991).

Sun, et al., "Fast Statistical Analysis of Rare Circuit Failure Events via Scaled-Sigma Sampling for High-Dimensional Variation Space," IEEE Transactions on Computer-Aided Design of Integrated Circuits and Systems, Vo. 34, No. 7, Jul. 2015, pp. 1096-1109.

* cited by examiner

PARALLEL MONTE CARLO SAMPLING FOR PREDICTING TAIL PERFORMANCE OF INTEGRATED CIRCUITS

TECHNICAL FIELD

Embodiments described herein are generally related to the field of circuit simulation in circuit modeling and fabrication. More specifically, embodiments described herein are related to sampling methods in Monte Carlo simulations to predict the tail performance of an integrated circuit.

BACKGROUND

In the field of integrated circuit (IC) modeling and fabrication, it is desirable to have an accurate estimate of yield for manufacturing a given IC model. Manufacturing variability is typically provided by foundries in the form of ascertained statistical variation factors (e.g., random variables) associated with specific circuit components. Numerous applications exist to model an IC performance based on the random variables provided by the foundries. Some applications make use of statistical techniques for sampling multiple random variables including Monte Carlo (MC) simulations to determine circuit performance. However, many available applications lack judicious sampling discrimination, resulting in lengthy and cost-ineffective use of computational capabilities. Further, lengthy simulation computations overly extend the turn-around time for modeling and re-modeling certain circuit components, creating a design bottleneck that manufacturers would desirably avoid.

The description provided in the background section should not be assumed to be prior art merely because it is mentioned in or associated with the background section. The background section may include information that describes one or more aspects of the subject technology.

SUMMARY

In a first embodiment, a computer-implemented method for determining the tail performance of an integrated circuit is described. The computer-implemented method includes simulating the integrated circuit over a group of samples selected from a plurality of samples to obtain a plurality of values for a group of circuit specifications and sorting the group of circuit specifications based on an expected number of samples to satisfy a stop criterion for each of the circuit specifications. The computer-implemented method also includes arranging a sequence of samples from the plurality of samples according to a sequence in the sorted group of circuit specifications, simulating the integrated circuit with one of the sequence of samples to obtain at least one circuit specification from the sorted group of circuit specifications, removing the at least one circuit specification from the sorted group of circuit specifications when the at least one circuit specification satisfies the stop criterion, and modifying a model for a second circuit specification in the sorted group of circuit specifications based on the at least one circuit specification. The computer-implemented method also includes reordering the sorted group of circuit specifications based on the model and determining an integrated circuit performance based on a simulation result for the at least one circuit specification.

In a second embodiment, a system is described that includes a memory storing instructions and at least one processor that executes the instructions. When executing the instructions, the processor is configured to simulate the integrated circuit over a group of samples selected from a plurality of samples to obtain a plurality of values for a group of circuit specifications and sort the group of circuit specifications based on an expected number of samples to satisfy a stop criterion for each of the circuit specifications. The processor is also configured to execute the instructions to arrange a sequence of samples from the plurality of samples according to a sequence in the sorted group of circuit specifications, simulate the integrated circuit with one of the sequence of samples to obtain at least one circuit specification from the sorted group of circuit specifications, and remove the at least one circuit specification from the sorted group of circuit specifications when the at least one circuit specification satisfies the stop criterion. The processor is also configured to execute the instructions to modify a model for a second circuit specification in the sorted group of circuit specifications based on the at least one circuit specification, reorder the sorted group of circuit specifications based on the model, and to determine an integrated circuit performance based on a simulation result for the at least one circuit specification.

In yet another embodiment, a non-transitory, machine-readable storage medium is described that includes machine-readable instructions for causing a processor to execute a method. The method includes simulating the integrated circuit over a group of samples selected from a plurality of samples to obtain a plurality of values for a group of circuit specifications, sorting the group of circuit specifications based on an expected number of samples to satisfy a stop criterion for each of the circuit specifications, and arranging a sequence of samples from the plurality of samples according to a sequence in the sorted group of circuit specifications. The method also includes simulating the integrated circuit with one of the sequence of samples to obtain at least one circuit specification from the sorted group of circuit specifications, removing the at least one circuit specification from the sorted group of circuit specifications when the at least one circuit specification satisfies the stop criterion, and modifying a model for a second circuit specification in the sorted group of circuit specifications based on the at least one circuit specification. The method also includes reordering the sorted group of circuit specifications based on the model and determining an integrated circuit performance based on a simulation result for the at least one circuit specification.

In a further embodiment, a system includes a means for storing instructions and a means to execute the instructions to perform steps to simulate the integrated circuit over a group of samples selected from a plurality of samples to obtain a plurality of values for a group of circuit specifications and sort the group of circuit specifications based on an expected number of samples to satisfy a stop criterion for each of the circuit specifications. The means to execute the instructions is also configured to execute the instructions to arrange a sequence of samples from the plurality of samples according to a sequence in the sorted group of circuit specifications, simulate the integrated circuit with one of the sequence of samples to obtain at least one circuit specification from the sorted group of circuit specifications, and remove the at least one circuit specification from the sorted group of circuit specifications when the at least one circuit specification satisfies the stop criterion. The means to execute the instructions is also configured to execute the instructions to modify a model for a second circuit specification in the sorted group of circuit specifications based on the at least one circuit specification, to reorder the sorted group of circuit specifications based on the model, and to determine an integrated circuit performance based on a simulation result for the at least one circuit specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
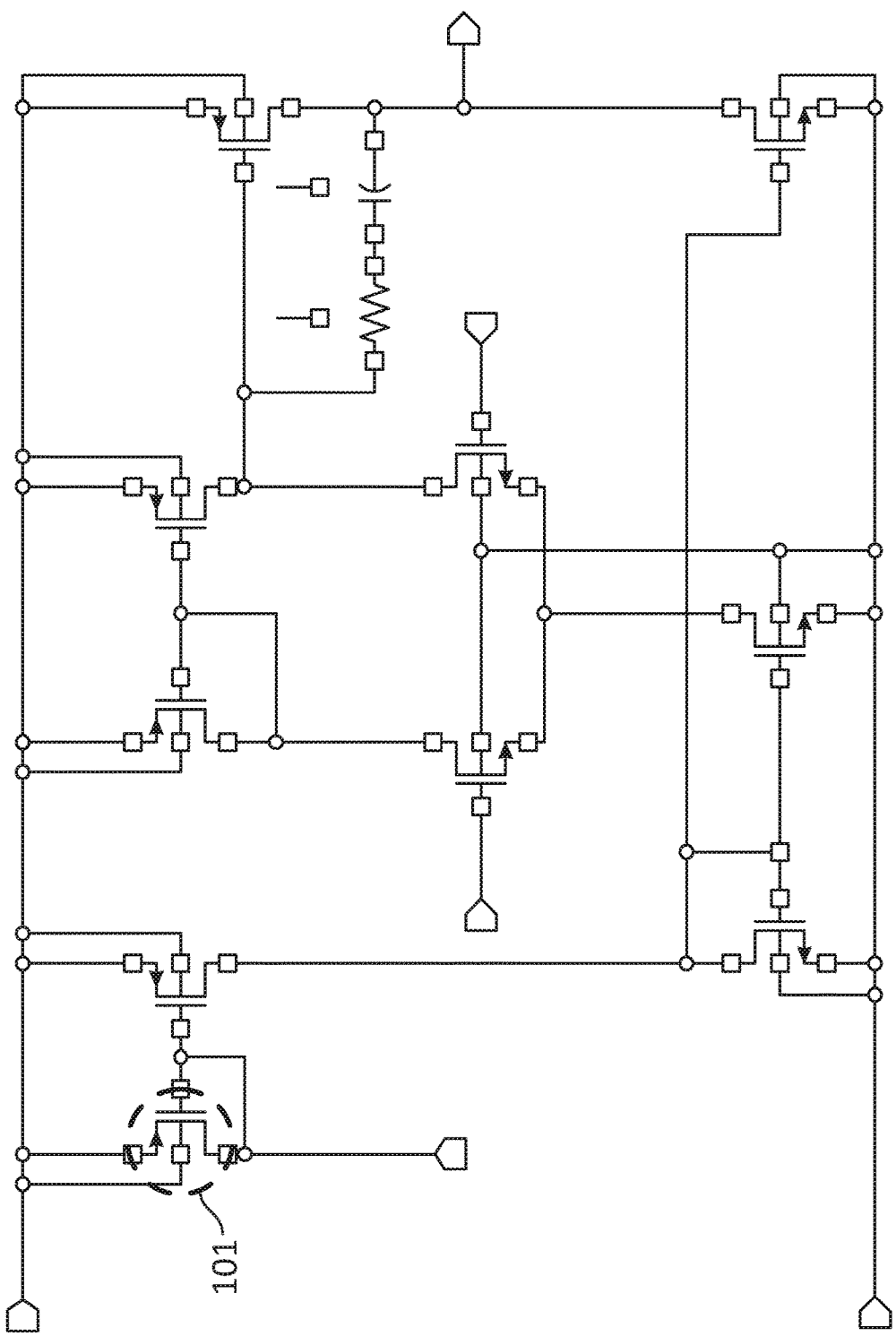
FIG. 1 illustrates an IC schematic according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In the field of IC modeling and fabrication, it is desirable to determine the worst possible circuit performance under any given configuration to accurately estimate the manufacturing yield for a given IC model. When the worst possible performance is known, IC modeling may target improving a circuit design until the worst possible performance satisfies the most stringent circuit specifications. Accordingly, the circuit yield may be enhanced and production targets and costs can be accurately determined. Due to the intrinsic randomness of circuit performance and fabrication, it may not be feasible to expect that the worst possible configuration will always be obtained at the design stage. Moreover, the high computational cost of simulation for large ICs constrains the number of random simulation samples that may be used in a given MC run. Even in situations where a tail region of a distribution for a circuit performance is used rather than a single worst performance, the method of selection of random samples in the MC simulation may have an impact in terms of accuracy, cost, and ultimate success of the task.

The disclosed system provides a method for reordering simulation samples to prioritize the tail region of a statistical distribution for a circuit performance according to one or more circuit specifications. Methods and systems as disclosed herein substantially reduce the total number of simulations that may be carried out to obtain an accurate description of the performance of ICs.

The disclosed system addresses a technical problem tied to computer technology and arising in the realm of computer networks, namely the technical problem of reducing the number of samples for circuit simulation to predict a circuit performance. The disclosed system solves this problem by modeling a response surface for one or more circuit specifications from selected Monte Carlo samples and reordering the remaining samples to expedite reaching the tail region of a statistical distribution for each of one or more circuit specifications.

Compared with similar flows based on MC reordering, embodiments as disclosed herein include a tail region of a statistical distribution having R sample values, which may include the single worst sample value. Accordingly, embodiments as disclosed herein include more than a single sample value that may reflect a less favorable performance of the integrated circuit more accurately. Thus, the likelihood of producing an accurate estimate of an IC performance is enhanced, relative to the prior art.

Also, embodiments as disclosed herein include a parallelized flow that simultaneously performs reordered simulations of as many circuit specifications as desired, thereby enabling the use of massively parallel computation architectures (e.g., cloud computing environments) to efficiently achieve a complete circuit description. Further, embodiments as disclosed herein provide an accurate sorting of circuit specifications based on the expected number of simulations to satisfy a sampling stop criterion. By sorting circuit specifications in an increasing order of the number of simulations to satisfy the sampling stop criterion, the process of predicting the tail performance of an integrated circuit is made more efficient. Accordingly, the number of simulation cycles to achieve a similar result is reduced when the sampling is selected according to the sorted circuit specifications. Embodiments as disclosed herein provide steps for modifying a current circuit specification model based on sampling results for prior simulations on the sorted circuit specifications. Thus, a more accurate response surface model of a circuit specification in terms of foundry-defined random variables may include complex functional representations such as nonlinear models, geometric functions, hypergeometric functions, transcendental functions, and the like.

FIG. 1 illustrates an IC schematic 100 according to some embodiments. IC schematic 100 may include a netlist having a plurality of circuit components 101. Without limitation, IC schematic 100 is an operational amplifier including a metal-oxide-semiconductor (MOS), field effect transistor (MOSFET) as a circuit component 101. In general, circuit components may include N-type MOS (NMOS) transistors, P-type MOS transistors (PMOS), resistors, capacitors, inductors, and the like. Some of the circuit specifications that may be relevant for IC schematic 100 may include, without limitation, an operational current, a unit gain frequency (UGF), a gain value (which may be a function of frequency and/or load), and a random offset (e.g., voltage turn-on). Accordingly, a user may be interested in designing IC schematic 100 according to the highest current that the design may draw, the lowest UGF that it may provide, lowest gain, and the largest random offset that may result under a wide range of operational configurations.

For each of circuit component 101, the foundry may provide a set of random variables and a model that predicts component values as a function of the random variables (also known as "process variables" and "mismatch variables," in the art). The foundry may further provide a statistical distribution (e.g., a normal distribution, a Poisson distribution, and the like) for each of the random variables, including a mean value and a standard deviation, targeting operational values of circuit component 101 (e.g., a threshold voltage for a transistor, $V_{th}$). Such information is provided by the foundry in the form of a process development kit (PDK) which is a library including text files that may express, e.g., the threshold voltage for an NMOS transistor, $m_1$, $V_{th}(m_1)$ as:

$$V_{th}(m_1) = 0.3 + 0.01 \cdot x_1 + 0.03 x_2 + 0.02 \cdot x_3 \quad (1)$$

where $x_1$, $x_2$, and $x_3$ are random variables associated with NMOS transistor $m_1$.

An expression like Eq. 1 is determined after performing a large number of experiments on multiple NMOS transistors fabricated by the foundry. In general, each circuit component 101 may have a number of random variables, $x_j$, associated with it, and each operational value may be associated to the random variables, $x_j$, by an expression similar to Eq. 1. In some embodiments, the number of random variables and the expression for the operational values in Eq. 1 may depend on the type of circuit component being considered (e.g., NMOS transistor, PMOS transistor, resistor, and the like). More generally, the set of random variables $x_1$, $x_2$, and $x_3$ may be designated by a vector, $x$, such that $x=(x_1, x_2, x_3)$. Hereinafter, reference to a specific collection, j, of the multiple values for all random variables in the PDK will be made as "sample vector $x_j$" (e.g. with a vector notation in bold).

Accordingly, a user configures IC schematic 100 by selecting width, length and other operational values for each of circuit components 101. The user configures IC schematic 100 to satisfy the circuit specifications, which may be defined by the user according to an application intended for IC schematic 100. To estimate a foundry yield for IC schematic 100, a user may include random variables $x_j$ constrained by expressions such as Eq. 1 in methods as disclosed herein.

Figure 2:
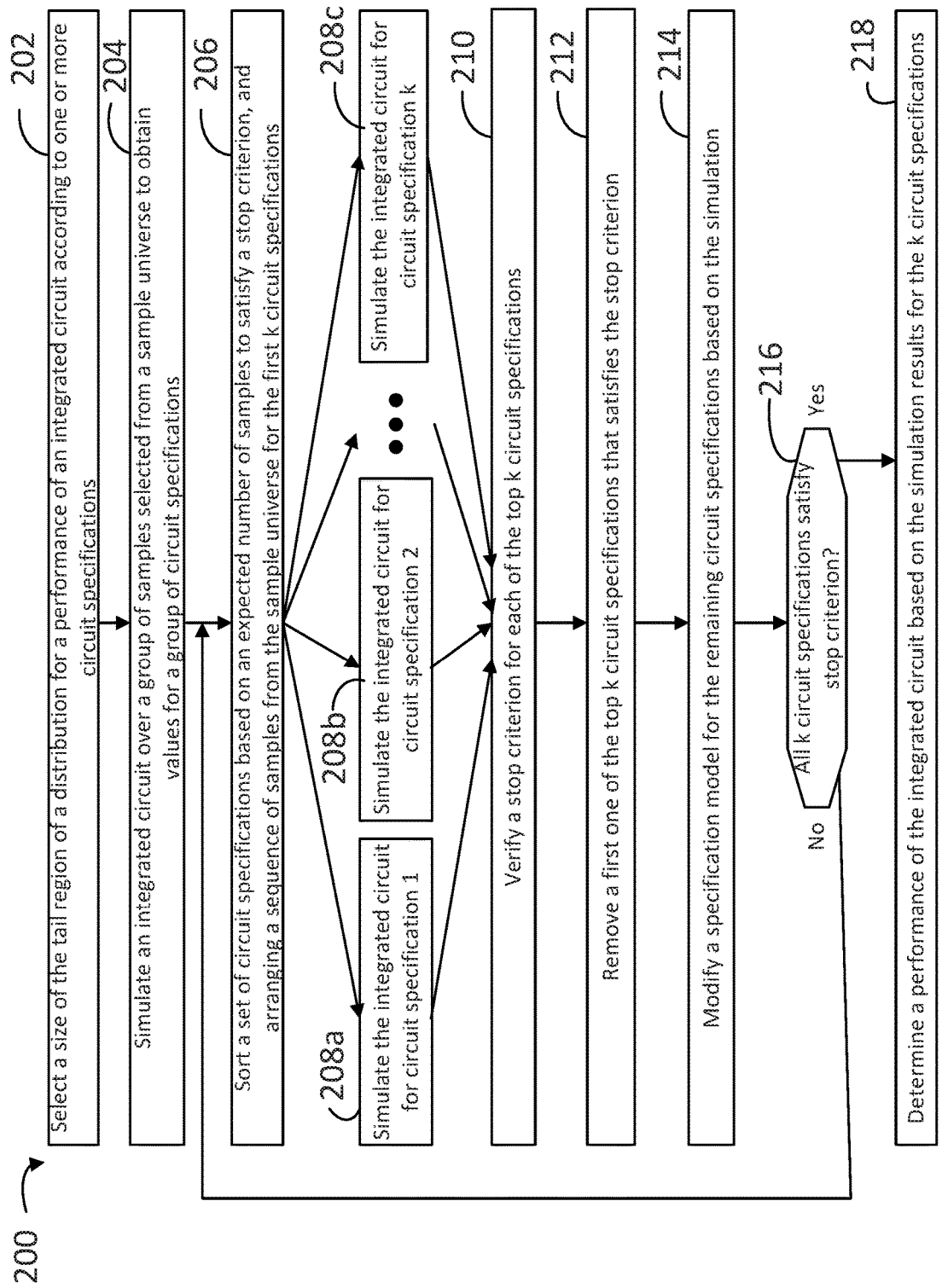
FIG. 2 is a flowchart illustrating steps in a method for parallel Monte Carlo simulation of an IC model according to some embodiments.

FIG. 2 is a flowchart illustrating steps in a method 200 for parallel MC simulation of an IC model according to some embodiments. At least some of the steps in method 200 may be performed by a computer having a processor executing commands stored in a memory of the computer. Further, steps as disclosed in method 200 may include retrieving, editing, and/or storing files in a database that is part of, or is communicably coupled to, the computer. Methods consistent with the present disclosure may include at least some, but not all of the steps illustrated in method 200 performed in a different sequence. Furthermore, methods consistent with the present disclosure may include at least two or more steps as in method 200, performed overlapping in time, or almost simultaneously.

In some embodiments, at least one or more of the steps in method 200 may be performed in a cloud computing environment, wherein a computer may include servers, such as a master server and a slave server. Accordingly, at least some of the steps illustrated in method 200 may be performed in parallel different processors following separate computational threads. For example, each of the separate computational threads may be performed by at least one slave server in each of multiple applications and processors dedicated to the specific computational thread.

In some embodiments, a master processor is configured to provide to a slave processor an initialization routine to perform at least one of the steps in method 200, and to control an execution of at least one of the steps in method 200 by the slave processors. Furthermore, a first processor may partially perform at least one of the steps of method 200 in a first computational thread and a second processor may partially perform at least a second one of the steps of method 200 in a second computational thread.

Method 200 may be performed when an IC foundry provides an IC specification and a PDK including a number of random variables, $x_i$, which have an impact on well-defined circuit specifications for an IC schematic (e.g., IC schematic 100).

Step 202 includes selecting a size, R, of a tail region of a statistical distribution for a circuit performance according to one or more circuit specifications. The value of R may be selected by the user in accordance with the computational capabilities at hand and the constraints imposed on the circuit specifications to be satisfied. In some embodiments, step 202 may include generating an initial set of MC samples to form a sample universe, $\Omega$, based on foundry specifications. In some embodiments, step 202 may include selecting different tail sizes, $R_i$, for different circuit specifications, i.

Step 204 includes simulating the IC over a group of sample values selected from the sample universe, $\Omega$ to obtain values for a group of circuit specifications. In some embodiments, step 204 includes performing an MC simulation using at least one of the samples from sample universe, $\Omega$. The MC simulation includes collecting at least one sample $x_j$ and performing a full simulation of the IC model using the sample values in sample vector $x_j$ to obtain an actual value of the specification ($y_{ij,actual}$) for sample vector $x_j$.

Step 204 may include performing an MC simulation for a subset, $S_s$, of sample universe, $\Omega$. Accordingly, step 202 includes evaluating at least R samples "j," and obtaining values $y_{ij,actual}$ for each of the circuit specifications (i=1 through k, j=1 through R) in subset $S_s$. Step 204 may include defining a set $S_s$ of simulated samples (e.g., samples $x_j$ for which a MC simulation of the IC model has been performed to obtain a value $y_{ij,actual}$). Likewise, step 204 may include defining a set $S_u$ of un-simulated samples. Accordingly, in some embodiments sets $S_s$ and $S_u$ satisfy the below equations:

$$\Omega = S_s \cup S_u \quad (2.1)$$

More generally, $$\Omega \supset S_s \cup S_u \quad (2.2)$$

wherein $$S_s \cap S_u = \phi \quad (2.3)$$

and $\phi$ is the empty set

Step 204 may further include modeling each of at least one or more circuit specifications $y_i$ (where i is an integer less than or equal to k) as a function of random variables (x), where x may in general be an array of one or more random variables ($x=x_1, x_2, \ldots, x_n$). In some embodiments, the function fi may be expressed mathematically as:

$$y_i = f_i(x) + e_i \qquad (3)$$

where $e_i$ is a random error modeled according to a statistical function. It should be noted that, in general, the function $f_i$ is not dependent on the sample vector $x_j$, or the number, n, of samples used. In some embodiments, $e_i$ follows a Normal distribution, as $$e_i = N(0, \sigma_i^2) \qquad (4)$$

where $\sigma_i$ is an error standard deviation obtained, for example, by cross-validation from values estimated over multiple samples. The value of $\sigma_i$ may depend on the number, n, of samples used. In some embodiments, step 204 includes finding a function $f_i$ such that the error standard deviation $\sigma_i$ is minimized.

In some embodiments, the function $f_i$ in Eq. 3 is a linear quadratic function or any higher order polynomial, rational, or transcendental function (e.g., trigonometric, logarithmic, exponential, hyperbolic, and the like). Function $f_i$ generally describes a surface in an n-dimensional hyperspace.

Step 206 includes sorting a set of circuit specifications based on an expected number of samples to satisfy a stop criterion. In some embodiments, step 206 further includes arranging a sequence of samples from the sample universe according to a sequence in the set of circuit specifications. In some embodiments, step 206 includes forming an ordered set, E, of circuit specifications and building a sample sequence from the first k specifications in the ordered set. In some embodiments, step 206 includes evaluating function $f_i$ (cf. Eq. 3) for circuit specification $y_i$ with a sample $x_j$ where j is greater than N. Accordingly, the ordered set of samples $x_j$ may be arranged based on a decreasing value of error $e_{ij}$.

Step 208a includes performing a reordered MC simulation for a first circuit specification. Accordingly, step 208a may include evaluating the circuit performance for each sample $x_j$ to obtain a value $y_{ij,actual}$.

Step 208b includes performing a reordered MC simulation for a second circuit specification.

Step 208c includes performing a reordered MC simulation for a k-th circuit specification.

Steps 208a, 208b, and 208c (hereinafter collectively referred to as "steps 208") may be performed simultaneously or almost simultaneously. For example, in some embodiments steps 208 may be performed in parallel in a networked computing environment, such as a cloud computing environment, wherein each of steps 208 is performed separately and independently in a dedicated computer or server, in a separate computational thread.

Step 210 includes verifying a stop criterion for each of the k circuit specifications. A stop criterion is selected by the user so that MC simulations may not be carried out over the entire ordered set, thereby reducing computational overhead. In some embodiments, step 210 includes stopping the simulation when a probability that a set of values for at least one of the k circuit specifications includes an R number of worst values is greater than a pre-selected threshold.

Step 212 includes removing a first one of the top k circuit specifications in ordered set E that satisfies the stop criterion. In some embodiments, more than one of the top k circuit specifications may satisfy the stop criterion. In this case step 212 may include removing any one, more than one, or all the circuit specifications that satisfy stop criterion.

Step 214 includes modifying a specification model for the remaining specifications based on the simulation. For example, step 214 includes modifying a model for at least a second circuit specification in the set of circuit specifications based on the simulation. In some embodiments, step 214 includes rebuilding a specification model for the remaining circuit specifications.

Step 216 includes verifying that all k circuit specifications satisfy the stop criterion (e.g., as per step 210). In some embodiments, step 216 includes verifying that the ordered set, $\Sigma$, is an empty set, $\phi$. When not all k circuit specifications have satisfied the stop criterion, method 200 is repeated from step 206.

When all k circuit specifications satisfy the stop criterion, step 218 includes determining a performance of the IC based on the simulation results for at least one circuit specification. In some embodiments, step 218 includes determining an integrated circuit performance based on the R-worst values that may be expected for each of the k circuit specifications (the R-size tail region in the distribution of circuit performance for one or more of the circuit specifications).

Figure 3:
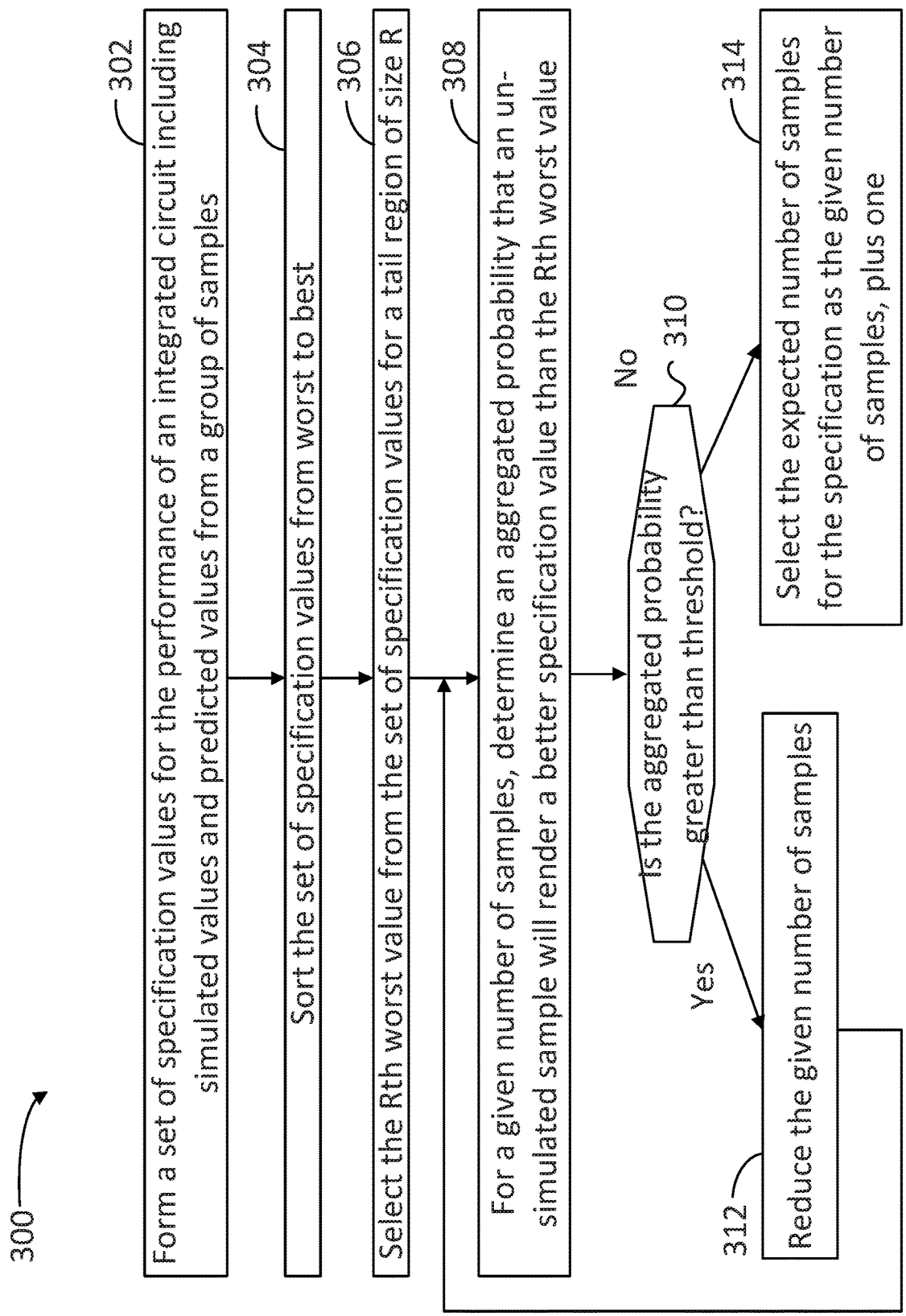
FIG. 3 is a flow chart illustrating steps in a method for determining an expected number of samples to use for determining a specification in an IC model according to some embodiments.

FIG. 3 is a flow chart illustrating steps in a method 300 for determining an expected number of samples to satisfy the stop criterion for a circuit specification in an IC model, according to some embodiments. In some embodiments, method 300 is performed over one or more circuit specifications to form the ordered set, $\Sigma$, of circuit specifications (cf. step 204 in method 200). Accordingly, the ordered set, $\Sigma$, is arranged with a first circuit specification associated with the least expected number of samples, and so on. At least some of the steps in method 300 may be performed by a computer having a processor executing commands stored in a memory of the computer. Further, steps as disclosed in method 300 may include retrieving, editing, and/or storing files in a database that is part of, or is communicably coupled to, the computer. Methods consistent with the present disclosure may include at least some, but not all of the steps illustrated in method 300, performed in a different sequence. Furthermore, methods consistent with the present disclosure may include at least two or more steps as in method 300, performed overlapping in time, or almost simultaneously.

In some embodiments, at least one or more of the steps in method 300 may be performed in a cloud computing environment, wherein a computer may include servers, such as a master server and a slave server. Accordingly, at least some of the steps illustrated in method 300 may be performed in parallel in different processors, following separate computational threads. For example, each of the separate computational threads may be performed by at least one of slave servers in each of multiple applications and processors dedicated to the specific computational thread.

In some embodiments, a master processor is configured to provide to a slave processor an initialization routine to perform at least one of the steps in method 300, and to control an execution of at least one of the steps in method 300 by the slave processors. Furthermore, a first processor may partially perform at least one of the steps of method 300 in a first computational thread and a second processor may partially perform at least a second one of the steps of method 300 in a second computational thread.

Step 302 includes forming a set of specification values for the performance of an IC including simulated values and predicted values from a group of samples. Step 302 may include forming a set $Z_i$ of specification values, $z_{ij}$, associated with sample universe, $\Omega$ (cf. Eqs. 2), wherein $$z_{ij} = \begin{cases} y_{ij,actual}, & \vec{x}_j \in S_s \\ y_{ij,predicted}, & \vec{x}_j \in S_u \end{cases} \quad (5)$$

Note that set $Z_i$ is associated with the selected specification i. Accordingly, step 302 may include forming multiple sets $Z_i$, each for a different circuit specification.

Step 304 includes sorting the set of specification values $Z_i$ from worst to best, to form a set $Z'_i$ having elements $z'_{ij}$. Elements $z'_{ij}$ are the same as elements $z_{ij}$, except that the order of elements $z'_{ij}$ indicates a decreasing specification value (where decreased specification value means improved circuit performance). Accordingly, $z'_{ij1} > z'_{ij2}$ when $j_1 < j_2$. Without limitation, the reverse is true when increased specification value means improved circuit performance, and set $Z'_i$ is sorted such that $z'_{ij1} < z'_{ij2}$ when $j_1 < j_2$.

In some embodiments, step 304 may also include sorting the set of predicted values $S_u$ from worst to best in a similar way as $Z'_i$. Accordingly, step 304 may include forming a set $S'_u$ having elements $q_{ij}$ selected from $\{y_{ij,predicted}$ such that $x_j \in S_u\}$ such that $q_{ij1} > q_{ij2}$ when $j_1 < j_2$ and a decreased specification value means improved circuit performance, or such that $q_{ij1} < q_{ij2}$ when $j_1 < j_2$ and an increased specification value means improved circuit performance.

Step 306 includes selecting the $R_{th}$ worst value, $z'_{iR}$ from the sorted set of specification values $Z'_i$ for a tail region of size R. In some embodiments, step 306 may include determining a probability $p'_{ij}$ that a simulated specification value $q_{ij}$ with $x_j \in S'_u$ be better than $z'_{iR}$. For example, in some embodiments step 306 may include performing the mathematical operations expressed in the formula $$p'_{ij} = \frac{1}{2}\left(1 + \mathrm{erf}\left(\frac{z'_{iR} - q_{ij}}{\sqrt{2} \cdot \sigma_i}\right)\right) \quad (6)$$

where "erf" is the well-known error function and $\sigma_i$ is a standard deviation as defined above.

Step 308 includes determining, for a given number of samples, s, the aggregated probability, $p_i(s)$, that an unsimulated sample in $Z'_i$ will render a better specification value than the Rth worst value.

$$p_i(s) = \prod_{j > s} p'_{ij} \quad (7.1)$$

Step 310 includes verifying that aggregated probability $p_i(s)$ is greater than a pre-selected threshold $t_1$. The pre-selected threshold $t_1$ is a factor that may be selected by the user, based on computational capabilities and relevance of the task at hand. For example, when the user has a wide range of servers (e.g., in a cloud computational environment) and the integrated circuit is subject to stringent constraints, the user may set $t_1$ to be as high as 95%, 99%, or even higher. When aggregated probability $p_i(s)$ is greater than the pre-selected threshold $t_1$, step 312 includes reducing the given number of samples and repeating method 300 from step 308. In some embodiments, step 312 includes reducing the given number of samples by one. A reduction in the given number of samples is expected to reduce aggregated probability, $p_i(s)$. This step guarantees that the expected number of samples to be associated with the specification is the smallest possible number from the set of specification values.

When aggregated probability $p_i(s)$ is less than the pre-selected threshold $t_1$, step 314 includes selecting the expected number of samples for the specification as s+1. Accordingly, it may be safely assumed that the selected specification will complete the tail sampling after the expected number of worst samples is processed under an MC simulation.

More generally, in some embodiments a sample number s, is sought such that for any number of samples, h, such that h≤s, the stop criterion cannot be satisfied, and such that when, h>s, the stop criterion can be satisfied. Accordingly, embodiments consistent with the present disclosure may select a value s+1 for the size of the tail region.

In some embodiments, the expected number of samples for specification i, $en_i$, may be found through mathematical expressions satisfying either one of the following conditions $$en_i = \sup\{s \in N : p_i(s) < t_1\} + 1, \quad (7.1)$$

or $$en_i = \inf\{s \in N : p_i(s) \geq t_1\} \quad (7.3)$$

Figure 4:
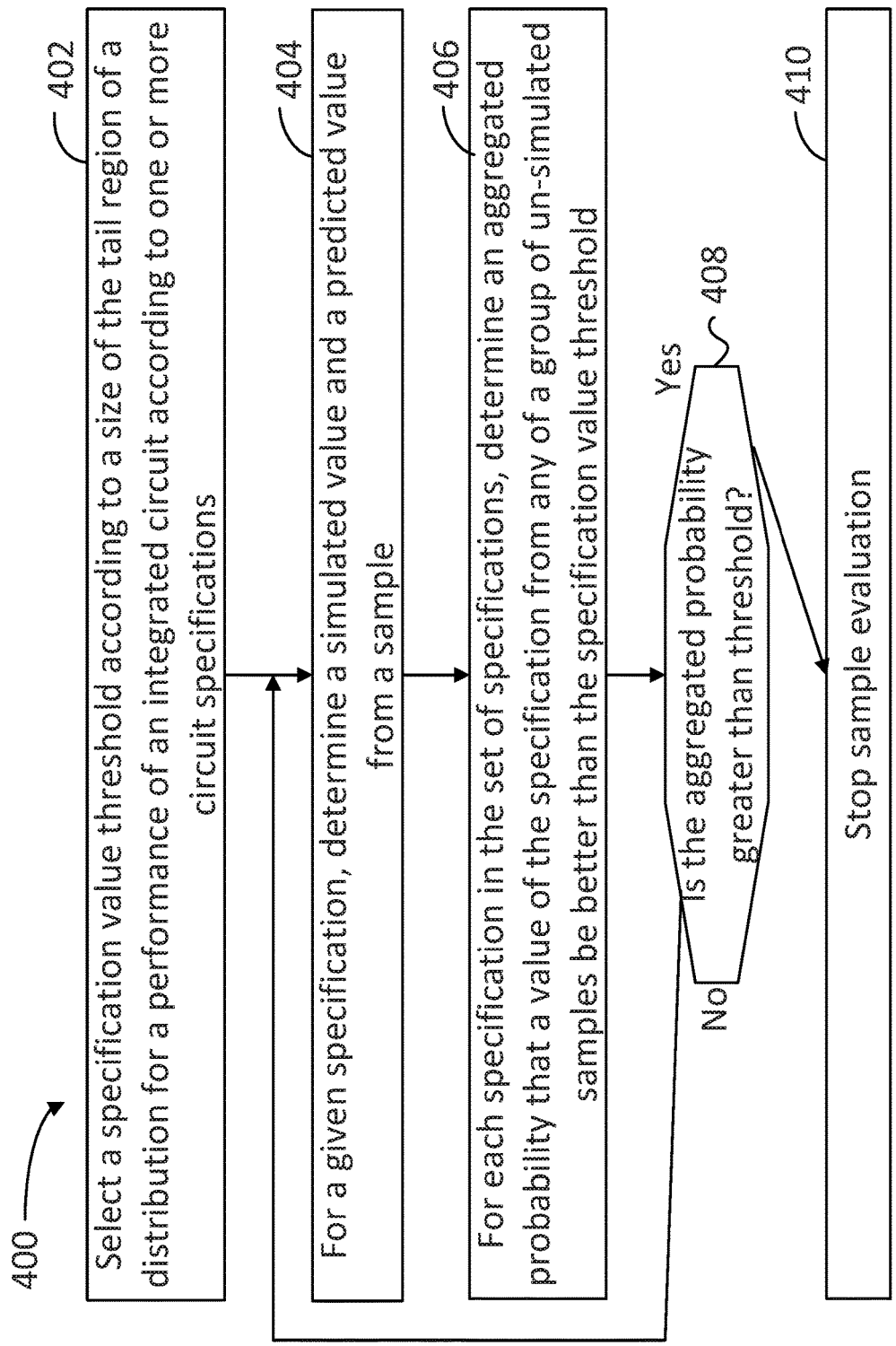
FIG. 4 is a flow chart illustrating steps in a method for stopping an MC simulation of an IC model performance, according to some embodiments.

FIG. 4 is a flow chart illustrating steps in a method 400 for stopping an MC simulation of an IC model performance according to some embodiments. At least some of the steps in method 400 may be performed by a computer having a processor executing commands stored in a memory of the computer. Further, steps as disclosed in method 400 may include retrieving, editing, and/or storing files in a database that is part of, or is communicably coupled to, the computer. Methods consistent with the present disclosure may include at least some, but not all of the steps illustrated in method 400, performed in a different sequence. Furthermore, methods consistent with the present disclosure may include at least two or more steps as in method 400, performed overlapping in time, or almost simultaneously.

In some embodiments, at least one or more of the steps in method 400 may be performed in a cloud computing environment, wherein a computer may include servers, such as a master server and a slave server. Accordingly, at least some of the steps illustrated in method 400 may be performed in parallel in different processors, following separate computational threads. For example, each of the separate computational threads may be performed by at least one of slave servers in each of multiple applications and processors dedicated to the specific computational thread.

In some embodiments, a master processor is configured to provide to a slave processor an initialization routine to perform at least one of the steps in method 400, and to control an execution of at least one of the steps in method 400 by the slave processors. Furthermore, a first processor may partially perform at least one of the steps of method 400 in a first computational thread and a second processor may partially perform at least a second one of the steps of method 400 in a second computational thread.

Step 402 includes selecting a specification value threshold, $t_2$, according to a size of the tail region of a distribution for a performance of an IC according to one or more circuit specifications (cf. step 202 in method 200). Specification value threshold, $t_2$, may be as threshold $t_1$ (cf. step 310 in method 300). Accordingly, step 402 may include selecting specification value threshold, $t_2$, based on computational capabilities and the relevance of the task at hand. In some embodiments, threshold $t_1$ may be the same as specification value threshold $t_2$. In yet other embodiments, the user may select different values for threshold $t_1$ and for specification value threshold $t_2$. Step 402 may also include identifying a set $S_{si}$ as a set of simulated samples from the reordered set for specification $y_i$. In general, it may be seen that $S_{si} \subset S_s$ (cf. Eqs. 1.1-1.3).

Step 404 includes, for a given specification, determining a simulated value and a predicted value from a sample, $x_j$. Step 406 may include determining, for each one of samples $x_j \in \Omega$, a value $y_{ij}$, predicted. For example, $y_{ij}$, predicted may be calculated as (cf. Eq. 2)

$$y_{ij,predicted} = f_i(x_j) + e_i \qquad (8)$$

Step 404 may also include finding a worse value $w_{iR}$ for each of the circuit specifications (i=1 through k), as $$w_{iR} = R_{th} \text{ largest sample of } \{y_{ij,actual}, x_j \in S_{si}\} \qquad (9.1)$$

wherein it is assumed that a large value of the circuit specification, $y_i$, is less desirable for circuit performance. When the opposite occurs, e.g., a low value of the circuit specification is desirable, Eq. 8.1 is replaced by $$w_{iR} = R_{th} \text{ smallest sample of } \{y_{ij,actual}, x_j \in S_{si}\} \qquad (9.2)$$

Step 406 includes, for the given specification, determining an aggregated probability that a value of the specification from any of the non-simulated samples be better than the specification value threshold ($w_{iR}$).

Step 406 may also include finding a probability $p_{ij}$ of an un-simulated sample $x_j \in Su$ to produce a better value for specification i than $w_{iR}$. For example, in some embodiments step 406 may include finding $p_{ij}$ from the following mathematical expression $$p_{ij} = \frac{1}{2}\left(1 + \text{erf}\left(\frac{w_{iR} - y_{ij,predicted}}{\sqrt{2} \cdot \max(\sigma_i, \sigma'_i)}\right)\right) \qquad (10)$$

where $\sigma'_i$ is an alternative standard deviation. In some embodiments, step 408 may include finding $\sigma'_i$ as $$\sigma'_i = \sqrt{\frac{1}{|S_{si}|} \sum_{xj \in S_{si}} (y_{ij,actual} - y_{ij,predicted})^2} \qquad (11)$$

where $|S_{si}|$ is the size (e.g., the number of elements) of set $S_{si}$. Step 406 may include determining a probability pi that set $S_{si}$ includes the tail of circuit specification i (e.g., "tail probability $p_i$"). In some embodiments, step 406 includes determining a tail probability $p_i$ as $$p_i = \prod_{xj \in S_u} p_{ij} \qquad (12)$$

Step 408 includes verifying that $p_i$ is greater than specification value threshold $t_2$. When $p_i$ is greater than $t_2$, then the stop criterion is satisfied and the sample evaluation is stopped in step 410. When $p_i$ is less than or equal to $t_2$, method 400 is repeated from step 404.

Figure 5:
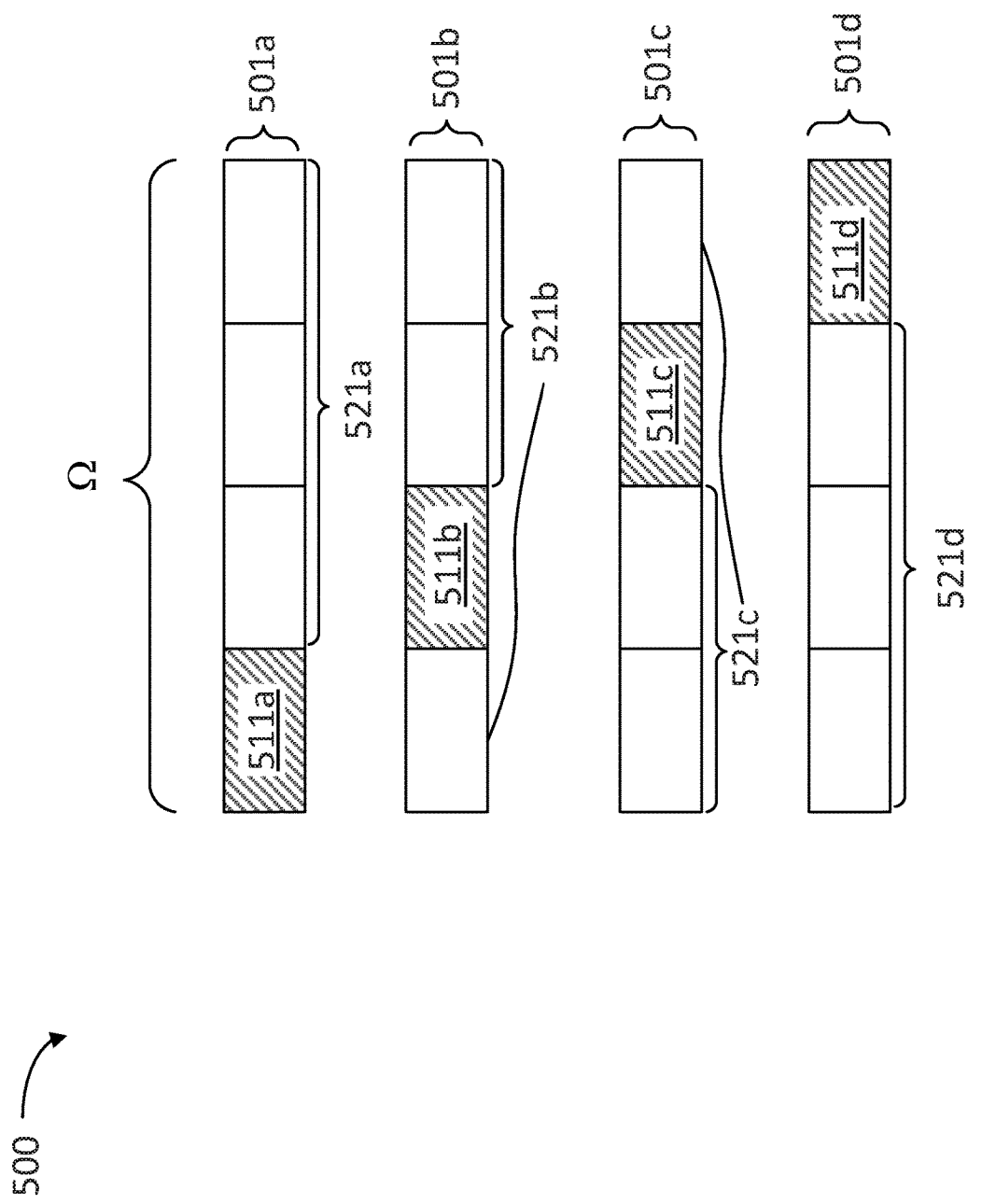
FIG. 5 is a block diagram illustrating a cross-validation scheme for model selection of a set of specifications in an IC according to some embodiments.

FIG. 5 is a block diagram illustrating a cross-validation 500 for model selection of a set of specifications in an IC according to some embodiments. Cross-validation 500 generates an error standard deviation, $\sigma$, for each of the one or more circuit specification models f (e.g., $\sigma_i$ and $f_i$). Accordingly, cross-validation 500 is performed when at least a first model $f$ is obtained for estimating the specification.

A universe of data samples, $\Omega$, is partitioned into F-folds (F=4 in cross-validation 500, without loss of generality). The F-folds are processed in F different simulation runs 501a, 501b, 501c, and 501d (hereinafter collectively referred to as simulation runs 501). At least one of the F-folds in each of simulation runs 501 is selected as a standard deviation fold 511a, 511b, 511c, and 511d (hereinafter collectively referred to as standard deviation folds 511). Standard deviation folds 511 are used to determine the error standard deviation, $\sigma_i$, for each run. The remaining F−1 folds in each of simulation runs 501 are model fitting folds 521a, 521b, 521c, and 521d (hereinafter, collectively referred to as model fitting folds 521). The model $f_i$ is fitted using model fitting folds 521 for each run. In some embodiments, the sample universe $\Omega$ is evenly divided into the F-folds, meaning that standard deviation folds 511 and model fitting folds 521 have the same, or almost the same size.

In some embodiments, each of the F folds of the sample universe $\Omega$ contains a different set of samples obtained by a MC selection of values for the random variables in vector x.

For each specification, $y_i$, each sample, $x_j$, from the sample universe, $\Omega$, is simulated once, and an error $e_{ij}$ is obtained as $$e_{ij} = y_{ij,actual} - y_{ij,predicted} \qquad (13)$$

The error standard deviation, $\sigma_i$, is obtained from $$\sigma_i = \sqrt{\frac{1}{N} \cdot \sum_{j=1}^{N} e_{ij}^2} \qquad (14)$$

where N is the size of the sample universe, $\Omega$. Note that in the above computation, the N values $e_{ij}$ in the sample universe $\Omega$ are divided into four different models for the same circuit specification. Each of the four different models is determined by a fit performed by model fitting folds 521. The specific number of folds, F, and the size of each fold (e.g., the total number of samples in the sample universe $\Omega$), is determined by the user according to the computational task at hand. For example, for a larger IC netlist, more folds F, each having fewer samples, may be desirable.

The model selection may include using different models including multiple basis functions of sample vector x having multiple individual components $x_j$. For example, some of the models may include "orthogonal matching pursuit" (OMP) with linear basis functions as in the following mathematical expression $$y_i = c + \sum_{j=1}^{M} a_{ij} \cdot x_j \qquad (15.1)$$

In some embodiments the model selection is based on least squares with linear basis functions. In some embodiments, the model selection is an OMP with linear and quadratic basis functions, as in $$y_i = c + \sum_{j=1}^{M} a_{ij} \cdot x_j + \sum_{j=1}^{M} b_{ij} \cdot x_j^2 \qquad (15.2)$$

In yet other embodiments, the model selection may include OMP with linear, quadratic basis functions including cross terms, as in $$y_i = c + \sum_{j=1}^{M} a_{ij} \cdot x_j + \sum_{j=1}^{M} b_{ij} \cdot x_j^2 + \sum_{j<k} d_{ijk} \cdot x_j \cdot x_k \qquad (15.3)$$

Note that indices j and k (e.g., $x_j$ and $x_k$) in Eqs. 15 are associated with individual random variables in sample vector, x. Cross-validation 500 provides a test for the accuracy of each of the models used (e.g., the value of $\sigma_i$, see above). Therefore, a user may choose the model that best satisfies an accuracy consideration and a computational efficiency consideration.

Figure 6:
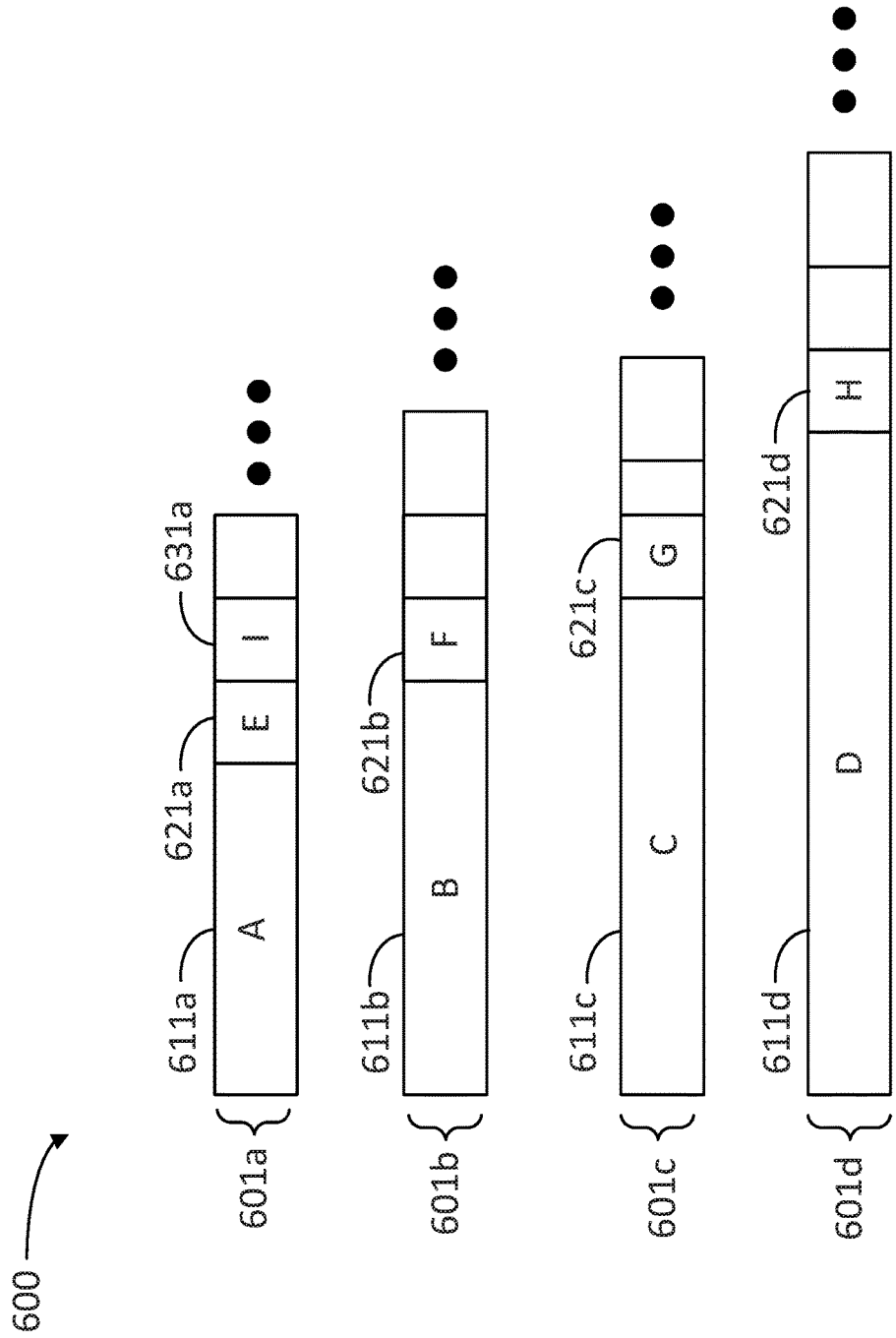
FIG. 6 is a block diagram illustrating a sample sequence for a MC simulation of an IC model according to some embodiments.

FIG. 6 is a block diagram illustrating a sample sequence 600 for an MC simulation of an IC model according to some embodiments. Sample sequence 600 enables prioritizing short computational tasks in the MC simulation of the IC model. The results from the initial shorter tasks are incorporated to subsequent, increasingly longer tasks to simplify and shorten their completion (e.g., the successful meet of a stop criterion).

After finishing a batch of samples, the specifications that satisfy a stop criterion are removed from the ordered set (cf. step 210 in method 200). The models for the remaining steps in the ordered set are rebuilt (cf. step 212 in method 200) into more accurate models (with smaller error standard deviations, $\sigma_i$). The more accurate models in turn may enable a quicker convergence to a stop criterion for the respective specification (cf. method 400). For example, reduced error standard deviation $\sigma_i$ and $\sigma'_i$ result in a larger argument for the erf function in Eq. 10, thereby increasing the value of $p_{ij}$ and thus the value of $p_i$ (cf. Eq. 12). Accordingly, the stop criterion is expected to occur over fewer number of sample iterations, j (cf. step 214 in method 200).

When an expected number of samples have been submitted for each specification (cf. method 300), the remaining samples in a sample universe, $\Omega$, are added to the simulation of each remaining specification in a "round-robin" fashion.

Sample sets 601a, 601b, 601c, and 601d (hereinafter collectively referred to as sample sets 601) correspond to specifications "a," "b," "c" and "d," respectively. For example, specifications a, b, c, and d may be part of ordered set E, which means that the expected number of samples to achieve the stop criterion is lower for specification a (e.g., expected number of samples 611a, "A") than for specification b (e.g., expected number of samples 611b, "B"). Likewise, expected number of samples 611b is lower than for specification c (e.g., expected number of samples 611c, "C"), and expected number of samples 611c is lower than for specification d (e.g., expected number of samples 611d, "D").

When none of the specifications have satisfied a stop criterion, specification a is prioritized to process extra samples 621a (E) available, in the expectation that specification a will be the first to satisfy a stop criterion. A following batch of extra samples available 621b (F) is assigned to specification b, the next batch of extra samples 621c (G) is assigned to specification c. Further samples 621d (H) that are available may be assigned to specification d. A third round-robin may be desirable when specification a has not satisfied the stop criterion and new samples 631a (I) become available.

When specification a satisfies the stop criterion and is removed from the ordered set E, a remodeling of specifications b, c and d is expected to converge more rapidly. Accordingly, the simulated samples that have produced the R-sized tail for specification a, are similarly expected to produce M-sized tails for specifications b, c, and d, where M is similar to R, albeit somewhat lower (in which case further testing may be desirable). Accordingly, reordering sample sequences to give preference to specifications that are expected to converge faster accelerates the convergence of other specifications. Re-ordering a sample sequence 600 may be performed within the context of a reordered MC simulation (cf. steps 206 in method 200).

Figure 7:
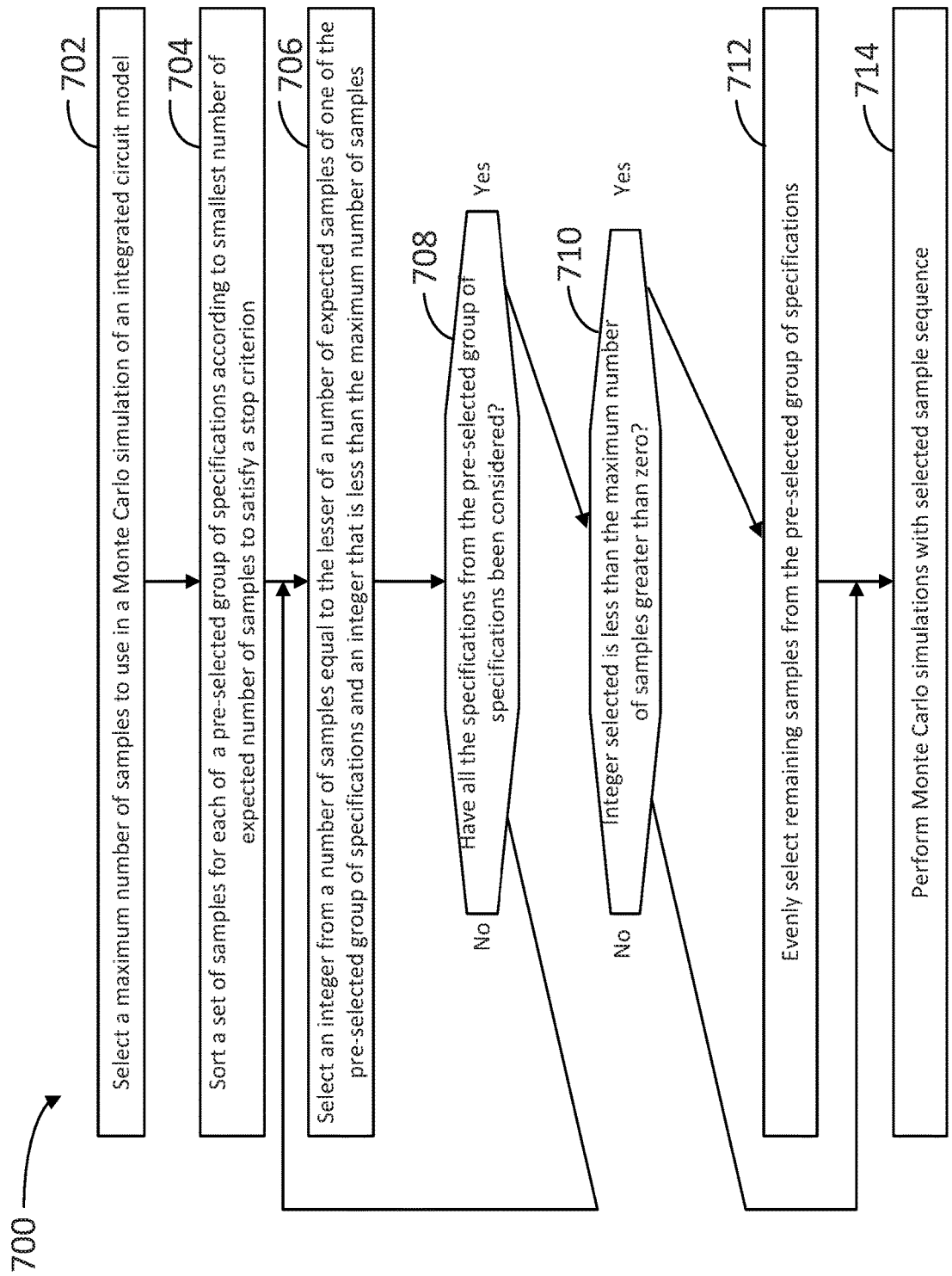
FIG. 7 is a flow chart illustrating a method to select a sample sequence for a Monte Carlo simulation of an IC model according to some embodiments.

FIG. 7 is a flow chart illustrating a method 700 to select a sample sequence for a MC simulation of an IC model according to some embodiments. At least some of the steps in method 700 may be performed by a computer having a processor executing commands stored in a memory of the computer. Further, steps as disclosed in method 700 may include retrieving, editing, and/or storing files in a database that is part of, or is communicably coupled to, the computer. Methods consistent with the present disclosure may include at least some, but not all of the steps illustrated in method 700, performed in a different sequence. Furthermore, methods consistent with the present disclosure may include at least two or more steps as in method 700, performed overlapping in time, or almost simultaneously.

In some embodiments, at least one or more of the steps in method 700 may be performed in a cloud computing environment, wherein a computer may include servers, such as a master server and a slave server. Accordingly, at least some of the steps illustrated in method 700 may be performed in parallel in different processors, following separate computational threads. For example, each of the separate computational threads may be performed by at least one of slave servers in each of multiple applications and processors dedicated to the specific computational thread.

In some embodiments, a master processor is configured to provide to a slave processor an initialization routine to perform at least one of the steps in method 700, and to control an execution of at least one of the steps in method 700 by the slave processors. Furthermore, a first processor may partially perform at least one of the steps of method 700 in a first computational thread and a second processor may partially perform at least a second one of the steps of method 700 in a second computational thread.

Step 702 includes selecting a maximum number of samples to use in a MC simulation of an IC model. Accordingly, step 702 may include determining a value, L, for the size of sample universe $\Omega$. Step 702 may include considering computational capabilities for the simulation task.

Step 704 includes sorting a set of samples for each of a pre-selected group of specifications according to a smallest number of expected number of samples to satisfy a stop criterion for each specification (cf. method 300).

Step 706 includes selecting an integer from a number of samples equal to the lesser of a number of expected samples of one of the pre-selected group of specifications and an integer that is less than the maximum number of samples.

Step 708 includes verifying that all the specifications from the pre-selected group of specifications are considered. When one or more specifications remain to be considered, method 700 is repeated from step 706.

Step 710 includes verifying that the integer selected in step 706 is an integer greater than zero when all the specifications are considered according to step 708.

When the integer selected in step 706 is greater than zero, step 712 includes evenly selecting the remaining samples from the pre-selected group of specifications.

Step 714 includes performing the MC simulations with the selected sample sequence.

In some embodiments, step 714 is performed when the integer selected in step 706 is less than or equal to zero.

Figure 8:
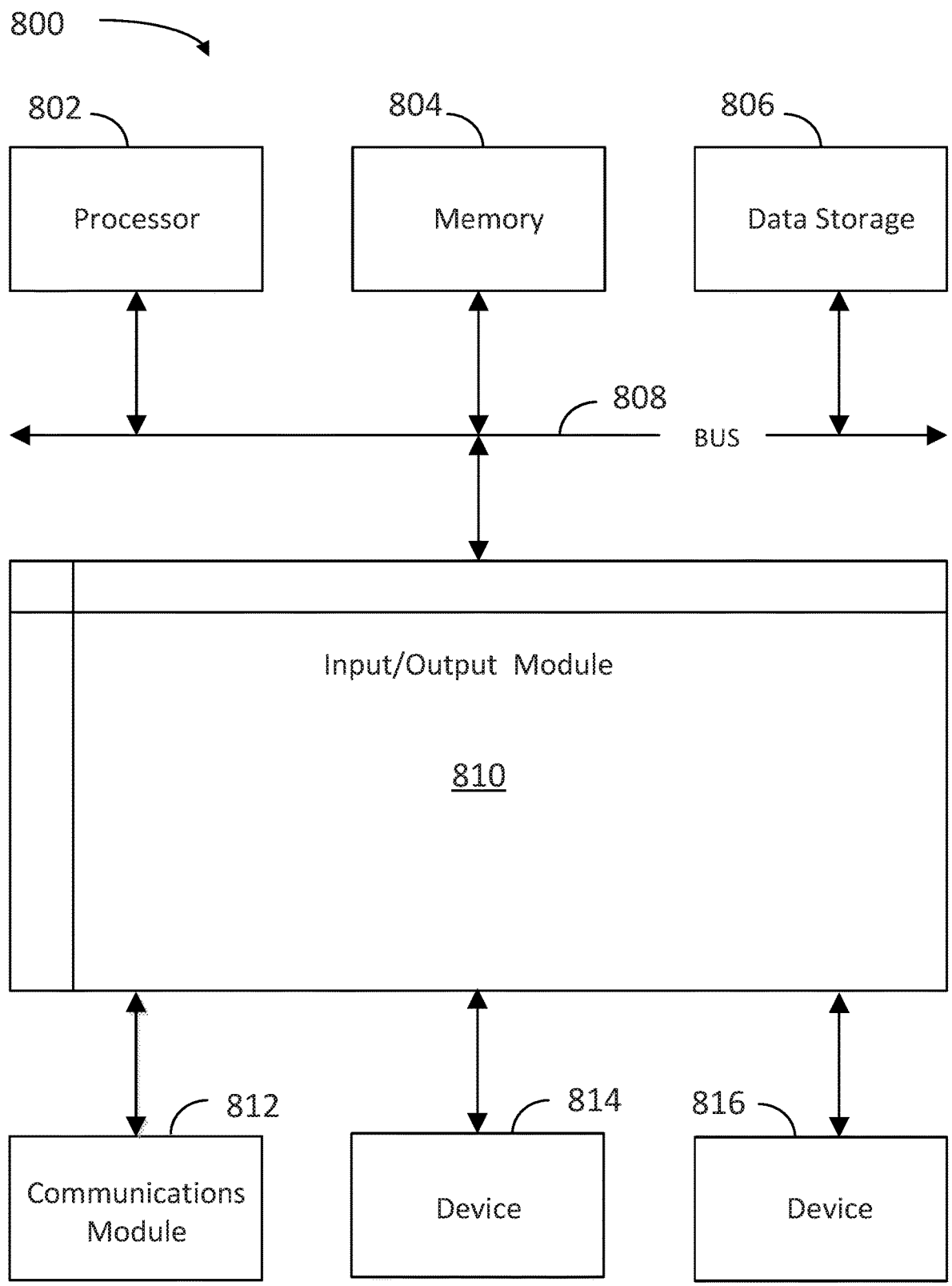
FIG. 8 is a block diagram illustrating an example computer system that includes a design tool, according to some embodiments.

FIG. 8 is a block diagram illustrating an example computer system 800 with which the methods and steps illustrated in FIGS. 2-7 can be implemented, according to some embodiments. In certain aspects, computer system 800 can be implemented using hardware or a combination of software and hardware, either in a dedicated server, integrated into another entity, or distributed across multiple entities.

Computer system 800 includes a bus 808 or other communication mechanism for communicating information, and a processor 802 coupled with bus 808 for processing information. By way of example, computer system 800 can be implemented with one or more processors 802. Processor 802 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 802 may include modules and circuits configured as a 'placing' tool or engine, or a 'routing' tool or engine, to place devices and route channels in a circuit layout, respectively and as disclosed herein.

Computer system 800 includes, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. For example, in some embodiments a computer program can be deployed or executed on multiple computers networked in a cloud computing environment, as disclosed herein. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions.

Computer system 800 is coupled via input/output module 810 to various devices. The input/output module 810 is any input/output module. Example input/output modules 810 include data ports such as USB ports. The input/output module 810 is configured to connect to a communications module 812. Example communications modules 812 include networking interface cards, such as Ethernet cards and modems. In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a LED (light emitting diode), CRT (cathode ray tube), or LCD (liquid crystal display) screen, for displaying information to the user.

Methods as disclosed herein may be performed by computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein (e.g., as in methods 200, 300, 400 and 700). One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 includes servers and personal computer devices. A personal computing device and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for determining the tail performance of an integrated circuit, comprising:
   determining a plurality of values for a group of circuit specifications at least by simulating the integrated circuit over a group of samples in a plurality of samples;
   sorting the group of circuit specifications into a sorted group of circuit specifications based at least in part on either the plurality of values or based at least in part on a number of samples that satisfies a stop criterion for the group of samples in the plurality of samples;
   determining a first circuit specification from the sorted group at least by analyzing the integrated circuit with the sequence of samples based at least in part upon either the stop criterion or based at least upon a sequence in the sorted group;
   reducing the sorted group into an empty group based at least in part upon the stop criterion at least by removing the first circuit specification from the sorted group when the first circuit specification satisfies the stop criterion;
   modifying a model into a modified model for a second circuit specification in the group of circuit specifications based at least in part on the first circuit specification that is removed; and
   determining a performance metric value of the integrated circuit based at least in part on a result of an analysis for the first circuit specification.

2. The computer-implemented method of claim 1, further comprising stopping the analysis when a probability that the plurality of values for the group of circuit specifications includes one or more values for the first circuit specification is greater than a threshold.

3. The computer-implemented method of claim 1, wherein modifying the model comprises at least one of a partial least squares or an orthogonal matching pursuit with basis functions comprising linear polynomials, quadratic polynomials, or a combination of linear and quadratic polynomials defined as functions of a group of random variables.

4. The computer-implemented method of claim 1, further comprising:
   receiving, from a foundry, a process development kit including a list of random variables associated with an operational value of one or more circuit components of a plurality of circuit components in the integrated circuit; and
   forming a sample universe at least by using a Monte Carlo selection of a group of random variables.

5. The computer-implemented method of claim 1, further comprising validating the modified model for the second circuit specification at least by determining an error standard deviation of a simulated circuit specification value and a predicted circuit specification value, wherein the predicted circuit specification value is determined at least with the modified model for the second circuit specification.

6. The computer-implemented method of claim 1, further comprising:
evaluating a predicted circuit specification value with a sample from the plurality of samples; and
determining the performance metric value of the integrated circuit using at least the predicted circuit specification value.

7. The computer-implemented method of claim 1, wherein sorting the group of circuit specifications comprises determining the number of samples based at least in part on the group of circuit specifications and further based at least in part on a group of one or more predicted circuit specifications from the plurality of samples, wherein the group of one or more predicted circuit specifications is at least partially determined from the modified model for the second circuit specification.

8. The computer-implemented method of claim 1, further comprising re-organizing the group of samples in the plurality of samples based at least in part on reordering the sorted group of circuit specifications.

9. The computer-implemented method of claim 1, wherein determining the performance metric value comprises determining a probability that the plurality of values for the group of circuit specifications is better than one or more worse values for the group of circuit specifications.

10. A system, comprising:
a memory, storing computer code, and
at least one processor that executes the computer code to:
determine a plurality of values for a group of circuit specifications at least by simulating the integrated circuit over a group of samples in a plurality of samples;
sort the group of circuit specifications into a sorted group of circuit specifications based at least in part either on the plurality of values or based at least in part on a number of samples that satisfies a stop criterion for the group from the plurality of samples;
determine a first circuit specification from the sorted group at least by analyzing the integrated circuit with one of the sequence of samples based at least in part upon either the stop criterion or based at least in part upon a sequence in the sorted group;
reduce the sorted group into an empty group based at least in part upon the stop criterion at least by removing the first circuit specification from the sorted group when the first circuit specification satisfies the stop criterion;
modify a model into a modified model for a second circuit specification in the group of circuit specifications based at least in part on the first circuit specification that is removed; and
determine a performance metric value of the integrated circuit based at least in part on a result of an analysis for the first circuit specification.

11. The system of claim 10, wherein the at least one processor comprises a master processor and a slave processor coupled through a network connection, and the master processor is configured to provide the slave processor with an initialization routine to perform at least a portion of the computer code and to control an execution of the at least one operation performed by the slave processor.

12. The system of claim 10, wherein the at least one processor comprises a first processor partially obtaining the first circuit specification in a first computational thread and a second processor partially obtaining the second circuit specification in a second computational thread.

13. The system of claim 10, wherein the at least one processor further executes the computer code to terminate simulating the integrated circuit when a probability that the plurality of values for the group of circuit specifications includes one or more values for the first circuit specification is greater than a threshold.

14. The system of claim 10, wherein the at least one processor that executes the computer code to modify the model further executes the computer code to modify the model with at least one of a partial least squares or an orthogonal matching pursuit with basis functions comprising linear polynomials, quadratic polynomials, or a combination of linear and quadratic polynomials defined as functions of a group of random variables.

15. The system of claim 10, wherein the at least one processor further executes the computer code to receive, from a foundry, a process development kit including a list of random variables associated with an operational value of one or more circuit components of a plurality of circuit components in the integrated circuit, and to form a sample universe at least by using a Monte Carlo selection of a group of random variables.

16. The system of claim 10, wherein the at least one processor further executes the computer code to validate the modified model for the second circuit specification at least by determining an error standard deviation of a simulated circuit specification value and a predicted circuit specification value, wherein the predicted circuit specification value is determined at least with the modified model for the second circuit specification.

17. The system of claim 10, wherein the at least one processor further executes the computer code to evaluate a predicted circuit specification value with a sample from the plurality of samples and to determine the performance metric value of the integrated circuit using at least the predicted circuit specification value.

18. A non-transitory, machine-readable medium comprising a memory storing instructions which, when executed by a processor, cause the process to perform a set of acts, the set of acts comprising:
determining a plurality of values for a group of circuit specifications at least by simulating the integrated circuit over a group of samples in a plurality of samples;
sorting the group of circuit specifications into a sorted group of circuit specifications based at least in part on either the plurality of values or based at least in part on a number of samples that satisfies a stop criterion for the group of samples in the plurality of samples;
determining a first circuit specification from the sorted group at least by analyzing the integrated circuit with one of the sequence of samples based at least in part upon either the stop criterion based at least in part upon a sequence in the sorted group;
reducing the sorted group into an empty group based at least in part upon the stop criterion at least by removing the first circuit specification from the sorted group when the first circuit specification satisfies the stop criterion;
modifying a model into a modified model for a second circuit specification in the group of circuit specifications based at least in part on the circuit first circuit specification that is removed from the sorted group; and
determining a performance metric value of the integrated circuit based at least in part on a result of an analysis for the first circuit specification.

19. The non-transitory, machine-readable medium of claim 18, wherein the set of acts further comprises stopping the simulation when a probability that the plurality of values for the group of circuit specifications includes one or more values for the first circuit specification is greater than a threshold.

20. The non-transitory, machine-readable medium of claim 18, wherein modifying the model comprises at least one of a partial least squares or an orthogonal matching pursuit with basis functions comprising linear polynomials, quadratic polynomials, or a combination of linear and quadratic polynomials defined as functions of a group of random variables.

\* \* \* \* \*